United States Patent [19]

Carrier

[11] 4,233,881
[45] Nov. 18, 1980

[54] WALL FASTENER STRUCTURE

[76] Inventor: Vernon J. Carrier, 25830 Viana St., Lomita, Calif. 90717

[21] Appl. No.: 903,110

[22] Filed: May 5, 1978

[51] Int. Cl.³ .......................................... F16B 13/10
[52] U.S. Cl. ....................................... 85/81; 85/5 P; 85/83; 24/221 R
[58] Field of Search .................. 85/5 P, 79, 80, 81, 85/82, 83, 84; 24/221 R; 403/348

[56] References Cited

U.S. PATENT DOCUMENTS

| 822,769   | 6/1906  | Quist          | 85/79 X |
| 3,319,510 | 5/1967  | Rapata         | 85/72   |
| 3,406,431 | 10/1968 | Armstrong et al. | 85/80 X |
| 3,461,772 | 8/1969  | Barry          | 85/84 X |
| 3,548,705 | 12/1970 | Nasser         | 85/84   |
| 3,765,295 | 10/1973 | Ptak           | 85/83 X |
| 3,927,597 | 12/1975 | Stults et al.  | 85/3 R  |
| 4,007,516 | 2/1977  | Coules         | 85/82 X |

FOREIGN PATENT DOCUMENTS

| 1306092 | 9/1962 | France | 85/82 |
| 1373626 | 8/1964 | France | 85/82 |
| 1432352 | 2/1966 | France | 85/5 P |
| 2289792 | 5/1976 | France | 85/81 |

OTHER PUBLICATIONS

"Engineers Illustrated Thesaurus," by Herkimer, William Penn Pub. Corp., N. Y., N. Y. copy, 1952 pp. 4 and 5.

Primary Examiner—Thomas J. Holko
Attorney, Agent, or Firm—Edward D. O'Brian

[57] ABSTRACT

A wall fastener structure which is particularly adapted for use with plasterboard walls can be constructed so as to use an expansion member and an expanding member. The expansion member is preferably a unitary article formed out of a somewhat resilient polymer material so as to include a sleeve, a flange extending outwardly from one end of the sleeve, and two arms extending outwardly from the other end of the sleeve. These arms are internally dimensioned so that a blade like shank on the expanding member may be inserted and twisted so as to cam or force outwardly the arms into engagement with the interior of a hole in a wall in a similar structure. The expanding member also includes a head limiting the amount that it can be inserted into the expansion member.

3 Claims, 6 Drawing Figures

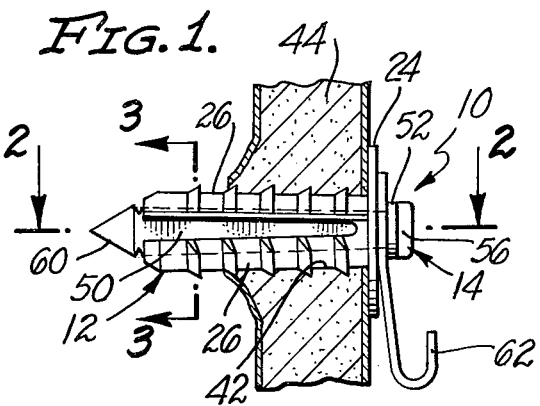
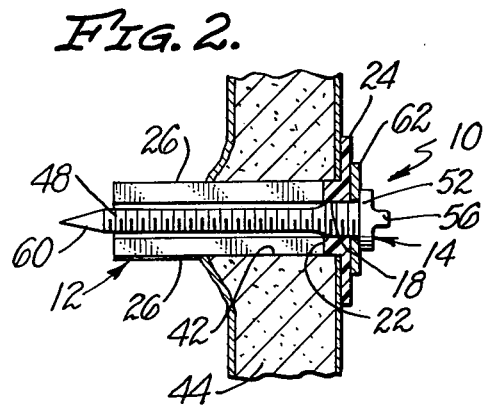
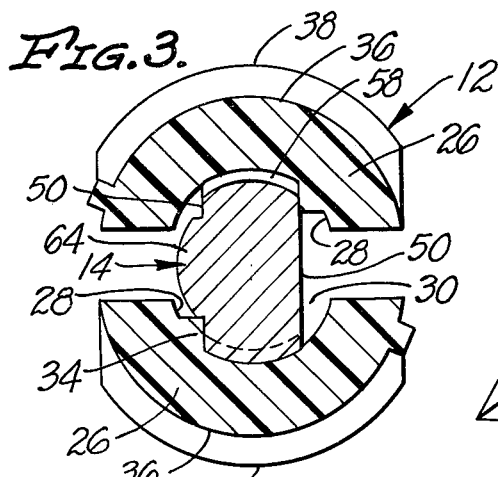
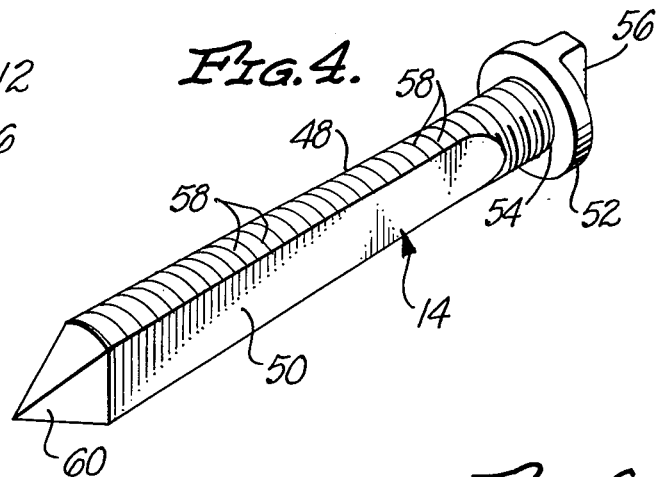
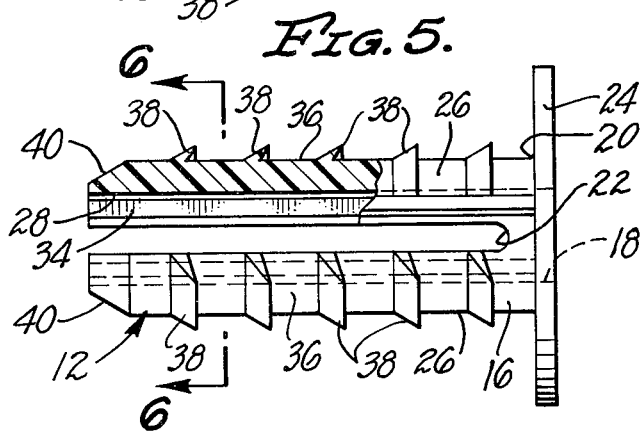
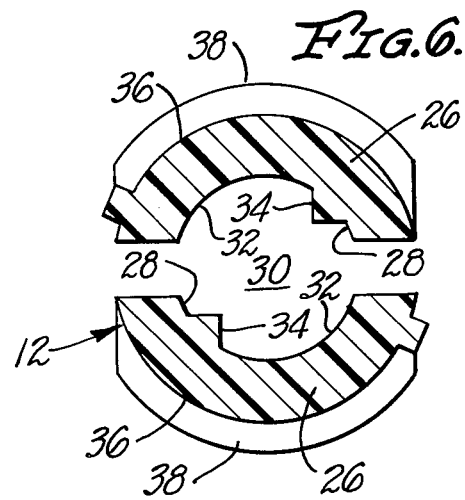

WALL FASTENER STRUCTURE

BACKGROUND OF THE INVENTION

The invention set forth in this specification pertains to a new and improved wall fastener structure. More specifically it is directed to a fastener structure which can be inserted into holes in existing walls and which can then be manipulated so as to be utilized in mounting a desired item upon such wall.

It will, of course, be realized that a wide variety of different types of wall fastener structures have been developed and utilized in the past. It is considered that it would be virtually impossible to describe all such prior structures in this specification. A number of different types of such prior structures are listed or tabulated in various common references such as the Engineer's Illustrated Thesaurus by Herkimer, copyright 1952, Chemical Publishing Company. On pages 4 and 5 of this text a variety of different wall fasteners are indicated.

An examination of this text will indicate that it has been commonplace to utilize spring wing toggle bolts as wall fasteners. It has also been common to utilize various types of fasteners constructed so as to utilize conical members to expand a sleeve in contact with the interior of an opening. Also it is commonplace to utilize split sleeves which are expanded through the use of a screw or similar member into engagement with the interior of an opening. Although the text noted does not show them it is commonplace to utilize so-called "Molly bolts" which are constructed so that the actuation of a threaded shaft causes outward deformation of deformable arms into engagement with the interior of a wall so as to mount such fasteners in place.

While all of such fasteners are unquestionably utilitarian in character they are all considered to have various disadvantages and limitations. As a result of this it is considered that there is a need for new and improved wall fastener structures. More specifically it is considered that there is a need for relatively inexpensive, easily manufactured, easily installed wall fastener structures which are very satisfactory for their intended utilization.

SUMMARY OF THE INVENTION

A basic objective of the present invention is to provide wall fastener structures which fulfill the needs indicated in the preceding discussion. Thus, the invention is intended to provide wall fastener structures which may be easily and conveniently manufactured at a nominal cost, which are easily utilized, and which are quite desirable for their intended utilization. Various other objectives and advantages of the invention will be apparent from a careful consideration of the remainder of this specification including the appended claims and the accompanying drawing.

A complete wall fastener structure of the present invention embodies two parts: an expansion member and an expanding member. These parts are adapted to be utilized together as a unit when a complete wall fastener structure of the present invention is secured in place upon a wall such as, for example, a common plasterboard wall or the like. Because of the manner in which the expansion member in such a complete structure is constructed it may be considered that the invention is concerned with a wall fastener structure which consists only of such an expansion member, although in its more detailed aspects the invention obviously concerns a complete wall fastener structure incorporating or embodying both of the parts indicated.

In accordance with the broader aspects of this invention it concerns a wall fastener structure which comprises: an expansion member including a sleeve having an end and an opening extending therethrough between said ends, a flange extending outwardly from adjacent to one of said ends and two expansion arms extending outwardly from the other of said ends, said arms extending generally parallel to one another, said arms being unattached, said arms having adjacent interior surfaces facing one another which are spaced so as to define a space between said arms which is aligned with said opening and extending along the length of said arms, said arms also having internal surfaces which are remote from one another, said internal surfaces being shaped and said arms being positioned with respect to one another so that a blade shaped member of less thickness than width may be inserted within the arms through the opening without changing the positions of the arms, said internal surfaces including cam surfaces capable of being engaged by said blade shaped member after said blade shaped member has been inserted between said arms and as said blade shaped member is twisted so that contact between said blade shaped member and said cam surfaces applies a pressure to said arms in order to deflect said arms outwardly from their normal configuration.

In a complete wall fastener structure in accordance with this invention a portion of a shank having a blade like shape serves as the blade shaped member indicated in the preceding. This shank forms the principal part of what was identified in the preceding as an expanding member. A head is located on one end of the shank so as to limit the insertion of the shank into the expansion member described in the preceding.

BRIEF DESCRIPTION OF THE DRAWING

The invention is best more fully described with reference to the accompanying drawing in which:

FIG. 1 is a side elevational view of a presently preferred embodiment of a complete wall fastener structure of this invention installed in a hole in a wall, the wall being shown in this figure in cross-section so that the wall fastener structure is clearly visible;

FIG. 2 is a cross-sectional view taken at line 2—2 of FIG. 1;

FIG. 3 is a cross-sectional view at an enlarged scale taken at line 3—3 of FIG. 1;

FIG. 4 is an isometric view at an enlarged scale of the expanding member employed in the wall fastener structure illustrated in the preceding;

FIG. 5 is a side elevational view at an enlarged scale of the expansion member illustrated in FIGS. 1 to 3 in which part of the member is broken away so as to be seen in section; and FIG. 6 is a cross-sectional view at a further enlarged scale taken at line 6—6 of FIG. 5.

The particular wall fastener structure illustrated in the drawing embodies the operative concepts or principles of the invention as set forth and defined in the appended claims. It is considered obvious that these concepts or principles can be embodied within wall fastener structures which differ from the precise structure illustrated as to minor details within the scope of routine engineering skill.

DETAILED DESCRIPTION

In the drawing there is shown a complete wall fastener structure 10 in accordance with this invention which includes an expansion member 12 and an expanding member 14. As noted in the preceding the expansion member 12 alone may be considered as a wall fastener structure even though it is adapted to be utilized with the expanding member 14. The expansion member 12 is preferably manufactured as a unitary body out of a polymer material such as linear polyethylene, nylon or the like which is relatively rigid in character but which is sufficiently resilient so as to be capable of deflecting in response to an applied pressure. The expanding member 14 is preferably formed of a material such as common steel which is harder and less resilient than the expansion member 12 so as to be capable of deflecting and deforming the expansion member 12 during the use of the complete structure 10.

The expansion member 12 is constructed so as to include a comparatively short sleeve 16 having an internal opening 18 extending between its ends 20 and 22. An outwardly extending flange 24 is located so as to extend outwardly from the end 22 while two identically formed arms 26 are located so as to extend outwardly from the end 20. These arms 26 extend substantially parallel to one another and are unattached to each other except to the extent that they are connected through the sleeve 16. These arms 26 include internal surfaces 28 which face one another and which are located so as to define an internal space 30 which extends the length of the arms 26 and which is aligned with the opening 18. These internal surfaces 28 include cam surfaces 32 which extend along the lengths of these arms 26 and stop walls 34.

The arms 26 also have generally cylindrical external surfaces 36 which carry outwardly extending partial thread-like gripping, somewhat ratchet-like ridges or flanges 38. Preferably the extremities (not separately numbered) of the surfaces 36 remote from the sleeve 16 are provided with beveled ends 40 in order to facilitate the insertion of the expansion member 12 into an opening 42 in a wall 44. Such an opening 42 should correspond in diameter to the diameter of the external surfaces 36 so that the expansion member 12 may fit closely within the opening 42 with the flanges 38 frictionally engaging the interior (not separately numbered) of the opening 42.

The expanding member 14 is constructed so that it may be utilized in expanding this expansion member 12. It includes an elongated shank 48 which is provided with two flat sides 50. These sides 50 are spaced from one another. A head 52 which is sufficiently large so as to be incapable of fitting through the opening 18 is located on one end 54 of the shank 48. This head 52 may be conveniently provided with a small handle 56 for use in turning the expanding member 14. These flat sides 50 are parallel to one another. A plurality of partial thread-like ridges 58 extending in planes nearly transverse to the axis (not indicated) of the shank 48 are located on the exterior of the shank 48 so as to extend between the exterior (not separately numbered) of the shank 48 except where the flat sides 50 are located. A pointed end 60 is located on the shank 48 remote from the end 54 so as to facilitate insertion of the expanding member 14 into the expansion member 12.

When the complete fastener structure 10 is to be assembled the expansion member 12 is located within an opening 42 in the wall 44 as indicated in the preceding. Next a member such as a hook 62 to be secured to the wall 44 is located around the shank 48 against the head 52. Then the pointed end 60 of the expanding member 14 is inserted through the opening 18 while the shank 48 is oriented so as to pass between the arms 26 without significantly deflecting or deforming these arms 26. The expanding member 14 is inserted in this manner as far as reasonably possible as indicated in FIGS. 1 and 2 of the drawing. At this point the handle 56 is twisted.

This will cause the shank 48 to turn so that the shank 48 engages the cam surfaces 32. As this occurs the ridges 58 will tend to engage and bite into the cam surfaces 32 to a minor extent sufficient to tend to interlock the shank 48 against longitudinal movement. As this occurs and as the shank 48 is turned 90 degrees from its original position as inserted the arms 26 will be expanded outwardly so as to firmly engage the interior (not separately numbered) of the opening 42. This will mount the complete structure 10 on the wall 44.

In order to provide for the maximum expansion of the arms 26 remote from the flange 24 and the head 52 it is considered preferable to form the shank 48 of a configuration as illustrated in FIGS. 1 and 4 of the drawing so that this shank 48 gradually increases in maximum dimension in accordance with the distance from the head 52. Even without such increase in maximum dimension the shank 48 has something of a knife-like shape. When the shank 48 is shaped in the manner noted in this paragraph it is, of course, necessary to shape both the opening 18 and the internal surfaces 28 in such a manner as to accommodate the largest dimension of the shank 48 as it is inserted during the assembly of the complete fastener structure 10 as noted.

Although a fastener structure 10 as described in the preceding is considered to be quite desirable and effective it is considered that such a structure may be improved by utilizing an elongated ridge 64 having a generally partially cylindrical shape which is located on one of the sides 50 of the shank 48 and which extends substantially along the length of this side 50. This ridge 64 is dimensioned so as to easily fit within the space 30 and so as to be spaced slightly from a cam surface 32 as the shank 48 is inserted within the expansion member 24 and prior to the expanding member 14 being twisted. When the expanding member 14 is twisted as indicated in the preceding discussion the ridge 64 will "pop over" a stop wall 34 so as to be positioned generally between the two arms 26 as indicated in FIG. 3 of the drawing.

The ridge 64 is considered desirable since in effect it acts as a guide member which serves to guide the insertion of a shank 48 into an expansion member 12 as described. This prevents what may be referred to as lateral shifting or displacement which might interfere with the desired mode of operation described in the preceding being achieved. If desired two of these ridges 64 could be used but it is not considered there is any need or necessity for two of these ridges 64.

I claim:
1. A wall fastener structure which includes:
an expansion member including a sleeve having ends and an opening extending therethrough between said ends, a flange extending outwardly from adjacent to one of said ends of said sleeve and two expansion arms extending from the other of said ends of said sleeve,
said arms extending generally parallel to one another, said arms being unattached, said arms having adja- cent interior surfaces facing one another which are spaced so as to define a space extending between said arms which is aligned with said opening in said sleeve and extending along the length of said arms, said arms also having external surfaces which are remote from one another, said internal surfaces being shaped and said arms being positioned in respect to one another so that a blade shaped member of less thickness than width may be inserted between said arms through said opening in said sleeve without changing the positions of said arms, said internal surfaces including cam surfaces, said cam surfaces being capable of being engaged by said blade shaped member after said blade shaped member has been inserted between said arms and as said blade shaped member is twisted so that contact between said blade shaped member and said cam surfaces applies a pressure to said arms in order to deflect said arms outwardly from their normal configuration, an expanding member, said expanding member including an elongated shank, a head on one end of said shank which is incapable of fitting through said opening, at least a portion of said shank having a blade like shape which is of less thickness than width, said portion of said shank being said blade like member, said portion of said shank includes flat sides on said shank which are located so as to be spaced from one another and ridge means located on said shank and extending outwardly from said shank between said flat sides, said shank includes an elongated ridge means for guiding the insertion of said shank in said expansion member located on one of said flat sides, said arms include gripping ridges located on said external surfaces so as to extend outwardly therefrom, said gripping ridges being located along the length of said arms, said internal surfaces include stop means adjacent to said cam surfaces for limiting the amount said blade shaped member can be twisted so that said blade shaped member can only be twisted 90 degrees.

2. A wall fastener structure which includes:

an expansion member including a sleeve having ends and an opening extending outwardly from adjacent to one of said ends of said sleeve and two expansion arms extending from the other of said ends of said sleeve, said arms having generally cylindrical external surfaces, said arms extending generally parallel to one another, said arms being unattached, said arms having adjacent interior surfaces facing one another which are spaced so as to define a space extending between said arms which is aligned with said opening in said sleeve and extending along the length of said arms, said arms also having external surfaces which are remote from one another, an expanding member, said expanding member including an elongated shank, a head on one end of said shank which is incapable of fitting through said opening, at least a portion of said shank having a blade-like shape which is of less thickness than width, said portion of said shank includes flat sides which are located so as to be spaced from one another, said flat sides being parallel to one another, said shank including a pointed end remote from said head, said arms including gripping ridges located on said external surfaces so as to extend outwardly therefrom, said gripping ridges being located along the length of said arms, said internal surfaces being shaped and said arms being positioned in respect to one another so that said expanding member may be inserted between said arms through said opening in said sleeve without changing the position of said arms, said internal surfaces including cam surfaces, said cam surfaces being capable of being engaged by said portion of said shank after said shank has been inserted between said arms and as said expanding member is twisted so that contact between said shank and said cam surfaces applies a pressure to said arms in order to deflect said arms outwardly from their normal configuration;

said internal surfaces also including stop means adjacent to said cam surfaces for limiting the amount said blade shaped member can be twisted so that said blade shaped member can only be twisted 90 degrees, said expansion member comprising a unitary body formed of a polymer material which is rigid in character but which is sufficiently resilient so as to be capable of deflecting and deforming in response to an applied pressure, and, said expanding member also including a plurality of ridges extending substantially transverse to the axis of said shank on the exterior of said shank between said sides, said ridges being dimensioned so as to engage and bite into said cam surfaces after said shank has been inserted between said arm as said shank is twisted so as to apply a pressure to said arm.

3. A wall fastener structure which includes:

an expansion member including a sleeve having ends and an opening extending therethrough between said ends, a flange extending outwardly from adjacent to one of said ends of said sleeve and two expansion arms extending from the other of said ends of said sleeve, said arms having generally cylindrical external surfaces, said arms extending generally parallel to one another, said arms being unattached, said arms having adjacent interior surfaces facing one another which are spaced so as to define a space extending between said arms which is aligned with said opening in said sleeve and extending along the length of said arms, said arms also having external surfaces which are remote from one another, an expanding member, said expanding member including an elongated shank, a head on one end of said shank which is incapable of fitting through said opening, at least a portion of said shank having a blade-like shape which is of less thickness than width, said portion of said shank includes flat sides which are located so as to be spaced from one another, said internal surfaces being shaped and said arms being positioned in respect to one another so that said expanding member may be inserted between said arms through said opening in said sleeve without changing the positions of said arms, said internal surfaces including cam surfaces, said cam surfaces being capable of being engaged by said portion of said shank after said shank has been inserted between said arms and as said expanding member is twisted so that contact between said shank and said cam surfaces applies a pressure to said arms in order to deflect said arms outwardly from their normal configuration, said expansion member comprises a unitary body formed of a polymer material which is rigid in character but which is sufficiently resilient so as to be capable of deflecting and deforming in response to an applied pressure, and said expanding member comprising a unitary body formed of a material which is harder and less resilient than said expansion member, said expanding member also including a plurality of ridges extending substantially transverse to the axis of said shank on the exterior of said shank between said sides, said ridges being dimensioned so as to engage and bite into said cam surfaces after said shank has been inserted between said arm as said shank is twisted so as to apply a pressure to said arm.

* * * * *